United States Patent Office 3,419,431
Patented Dec. 31, 1968

3,419,431
POLYELECTROLYTE GEL SEPARATOR AND BATTERY THEREWITH
Alan S. Michaels, Lexington, Mass., assignor to Amicon Corporation, Cambridge, Mass., a corporation of Massachusetts
No Drawing. Continuation-in-part of application Ser. No. 340,499, Jan. 27, 1964. This application Sept. 26, 1966, Ser. No. 581,722
The portion of the term of the patent subsequent to June 6, 1984, has been disclaimed
10 Claims. (Cl. 136—26)

ABSTRACT OF THE DISCLOSURE

Electrical energy producing device having opposed electrodes in aqueous electrolyte and a separator between electrodes, which separator is made from two ionically associated polymers, one having anionic groups attached to a polymeric structure, the other having cationic groups attached to a polymeric structure.

---

This application is a continuation in part of copending application Ser. No. 340,499, filed Jan. 27, 1964, now Patent No. 3,324,068.

This invention relates to novel separator elements for use in electrical energy producing devices containing aqueous liquid electrolytes, particularly storage batteries and fuel cells. Lead sulfuric acid storage batteries embodying the novel separator elements are of particular importance.

Batteries and fuel cells of the type to which the present invention applies are those containing one or more individual cells, each containing at least one cathode, at least one opposing anode, and an aqueous liquid electrolyte in contact therewith. While in some cases the aqueous electrolyte may be alkaline, e.g. in a silver-zinc battery or in a hydrogen-oxygen fuel cell, the batteries and fuel cells with which separators of the present invention are particularly useful are those containing acidic electrolytes, e.g. lead sulfuric acid storage batteries.

Separators constructed in accordance with the present invention display remarkably high electrical conductivity when immersed in aqueous electrolyte solutions. When immersed in the usual mixture of water and sulfuric acid employed in lead storage batteries, for example, their conductivity is very nearly the same as that of the acid solution alone, so that powder loss ($I^2R$ loss) in the battery is minimized. When the acid is leached from such separators by an excess of water they display a tough microporous leather-like structure which is virtually nonconductive even when immersed in water, but they regain their conductivity and their resilient, rubbery properties when the acid is restored.

The separators of the present invention comprise sheets of ionically cross-linked polycationic and polyanionic polymers, which may be formed as described in the copending application of Michaels and Miekka Ser. No. 341,834, filed Jan. 24, 1964, and in U.S. Patent No. 3,271,496 issued Sept. 6, 1966. The shape and dimensions of the separators of the present invention may be the same as those of conventional separators. In a preferred embodiment the separators are provided with a plurality of spaced parallel ribs on at least one of their sides or faces to facilitate circulation of the electrolyte between the separator and the adjacent electrode and to permit escape of gas bubbles if they are formed. It is particularly important to provide such ribs on the face of the separator next to the anode in a lead-sulfuric acid storage battery, and it is frequently desirable to have similar parallel spaced ribs on the other side, adjacent the cathode, as well.

The polyelectrolytes useful in the separators of the present invention are organic polymers having dissociable ionic groups which impart electrolytic characteristics in forming salts and acids (in the case of anionic polyelectrolytes) and bases (in the case of cationic polyelectrolytes). Typical of these are the polymers of sodium styrene sulfonate and of vinyl benzyl trimethyl ammonium chloride, and other materials of the same general type having a synthetic organic polymeric structure, which, without the ionic groups (sulfonate or quaternary ammonium), would be a water insoluble film forming material. They are accordingly characterized by a sufficiently high molecular weight to be solid and capable of film formation (typically greater than 50,000) while having sufficient dissociable ionic groups chemically bonded to the polymeric structure to be water soluble. As a very general rule there should be at least one ionic group for every six repeating monomer (mer) units, or for each average chain interval of 12 carbon atoms.

Thus, in addition to the preferred polymers of sodium styrene sulfonate and vinyl benzyl trimethyl ammonium chloride, copolymers of these materials with other vinyl compounds in molar ratios of 1:6 or less may be employed, as well as other well known polyelectrolytes of the same general type, such as polyacrylic acid, hydrolyzed copolymers of styrene and maleic anhydride, polyvinyl sulfonic acid, sulfonated polystyrene, sulfonated polyvinyl, toluene, alkali metal salts of the foregoing acidic polymers, polyethyleneimine, polyvinyl pyridine, and polydimethylaminoethyl methacrylate, quaternized polyethyleneimine, quaternized poly (dimethylaminoethyl) methacrylate, polyvinyl methyl pyridinium chloride, and the like. Of the polymers containing anionic groups, those containing sulfonate groups are preferred, while cationic polymers containing quaternary ammonium groups are preferred.

The separator sheet may be formed by dissolving the polyanionic polyelectrolyte and polycationic polyelectrolyte separately in an aqueous medium containing a strong, shielding electrolyte such as sodium bromide or sulfuric acid; or by dissolving preformed solid finely-divided ionically cross-linked polyanionic-polycationic polyelectrolytes. The dissolution is aided either by the addition of a water miscible low polarity organic liquid having a volatility at least as great as that of water, e.g. a volatile water-miscible organic solvent, or preferably by heating the aqueous electrolyte solution to an elevated temperature. The solution is then caused to gel in a suitable mold by reducing the activity of the electrolyte in solution, for example by evaporating the volatile solvent or by cooling the heated solution. The solid gel sheet thus produced, which may have spaced parallel ribs formed integrally on one or both sides of the sheet by suitable choice of molding cavity, may be washed with water to leach out the residue of electrolyte used to form the solution and also the residue of any volatile organic solvent used.[1]

---
[1] The resultant gel sheet may be used in that form as a replacement for a conventional separator in a conventional battery or fuel cell.

However, if the electrolyte used in forming the solution is the same, e.g. sulfuric acid, as the electrolyte present in the battery or fuel cell in which the separator is to be used, and if no organic solvent has been used in preparing the casting solution, the solidified gel may be used without further treatment. In this form the gel sheet may be relatively soft and flexible, rather than tough and leathery, but nevertheless possesses the necessary mechanical strength to be shipped and to be handled during the assembly of a battery or fuel cell as well as to perform the functions required of a separator in preventing the electrodes from touching and minimizing dendritic growth or "treeing" between opposing electrodes. The gel sheet in this form may also be subjected to forming or shaping under pressure if desired, as by press forming or extrusion.

The relative proportions of the two polyelectrolyte polymers containing anionic and cationic groups respectively which are used in making the separators of the present invention may vary over a substantial range, from 10:1 to 1:10 by equivalent weight, preferably from 4:1 to 1:4 by equivalent weight.

The separators of the present invention may include, if desired, reinforcing or supporting elements such as fibers or filaments, woven or unwoven, or glass, polyethylene, polypropylene, or other material inert to the electrolyte and electrodes. The use of a thin layer of such non-woven fabric on the surface of the separators facilitates handling and assembling of the separators with the electrodes. However, separators composed solely of ionically cross-linked polyelectrolytes without any reinforcement perform well in batteries and fuel cells when immersed in aqueous electrolyte.

The following specific examples are intended to illustrate the present invention without serving as a limitation upon its scope.

EXAMPLE I

A solid finely-divided ionically cross-linked polyanionic-polycationic polymer complex was prepared by dissolving approximately 100 parts by weight of dry powdered poly (sodium styrene sulfonate) together with 333 parts by weight of an aqueous solution containing 30% by weight of poly (vinyl benzyl trimethyl ammonium chloride) in a solution consisting of 266 parts by weight of calcium nitrate tetrahydrate, 266 parts of 1,4-dioxane, and 33 parts of water, and diluting the resultant viscous syrup with cold tap water to precipitate a slurry which was then filtered, washed, dried, and ground to pass a 20 mesh sieve. The sole cross-links present in the solid resin complex were ionic cross-links.

A mixture was prepared containing 150 grams of sulfuric acid and 30 grams of distilled water. There were stirred into this mixture 30 grams of the finely-divided solid cross-linked resin complex described in the preceding paragraph. Then, 90 grams of methanol and approximately 5 drops of a fluorinated surface active agent (3M FC-170) were added. The surface active agent was employed to improve the flow and levelling properties of the solution; this mixture was placed in a tightly sealed jar and left on a roll mill for 24 hours. A viscous solution was formed which was subjected to centrifugation for five minutes.

One side of an 8" x 9" x 1/8" glass plate was covered with 2 mil polytetrafluoroethylene (Teflon) film and subsequently with polypropylene non-woven fabric (1.4 mils). The Teflon and polypropylene were held in place with ordinary masking tape along their margins. Care had to be taken to avoid surface wrinkles.

A 25-mil drawdown was made using the supernatant centrifuged solution on the covered plate with an adjustable, stainless steel drawdown bar. The drawdown was placed in an air circulation oven for one-half hour at 55° C. and subsequently heated in a vacuum oven at a pressure of 28 inches of mercury for two hours at 85° C., then cooled in a dessicator. A second drawdown was made over the first, this time with a clearance of 37½ mils, and the drying cycle described above was repeated. The drawdown plus drying cycle procedure was repeated twice again at drawdown bar clearances of 50 and 62.5 mils respectively.

After the last drawdown, the material was allowed to cool slowly in the vacuum oven over a preiod of about six hours with the vacuum of 28" being maintained.

After cooling, the gel was removed from the plate with a razor blade. The polypropylene non-woven fabric adhered firmly to the gel and served as a support, while the assemblage was readily released from the Teflon casting surface. Two such assemblages—each having a thickness of about 30 mils—were laminated together in a press at room temperature. Thickness was held to 52 mils by shims. After pressing, the assemblage was cut to desired lateral dimensions.

The acid content of the product was found to be 55% by weight as determined by titration.

The separators so prepared were placed between conventional pasted lead electrodes in a conventional cell containing sulfuric acid which was then subjected to charging or formation in the usual manner. When battery acid was employed in such cells the separators were found to function satisfactorily. The non-brittle resilient rubbery nature of the separators provided effective cushioning separation of the plates or electrodes, and also provided effective protection against growth of dendrites while at the same time minimizing power loss through their exceptionally high conductivity.

Similar results are obtained using other organic solvents, such as tetrahydrofuran, in the solution used for casting the separators.

EXAMPLE 2

The solid finely-divided ionically cross linked resin of Example 1, in an amount of 51 parts by weight, was stirred slowly into a mixture of 145 parts by weight of ethyl alcohol, 102 parts of water, and 102 parts of 96% sulfuric acid. A few drops of the fluorinated surface active agent used in Example 1 were added to improve the flow properties of the solution, and mixing was continued until a homogeneous viscous solution was formed as described in Example 1.

A layer of the solution was then cast on a glass plate as described in Example 1 using a drawdown setting of 12 mils. The layer was dried in air for 30 minutes at room temperature, followed by 30 minutes in a hot air oven at 60° C., and 30 minutes in a vacuum oven at 60° C. A second drawdown was then carried out on top of the dried sheet under the same conditions and the drying sequence was repeated. A final drying step for the completed sheet was carried out for three hours in a hot air oven at 60° C. The finished cast sheet had a thickness of approximately 7 mils and had a tacky surface. Nine of these sheets were plied up by laying one on top of the other to form a separator which was then cut to size to fit between two conventional pasted dry-charged lead plates or electrodes, each 0.070 inch thick and 1⅜ x 1⅛ inches. The assembled plates and intervening separator were then placed in a conventional cell to which was added liquid dilute sulfuric acid and the plates were formed or activated in the usual way. The concentration of the liquid aqueous sulfuric acid electrolyte was then adjusted by sulfuric acid to a specific gravity of 1.260 (conventional battery acid) and subjected to a cycling charge and discharge test, the discharge being carried out at a rate of 0.09 ampere to a voltage of 1.75 volts in each cycle.

A second cell was prepared to act as a control which was identical with the first except that it contained, in place of the ionically cross-linked polyelectrolyte polymer separator, a conventional separator of paper impregnated with phenolic resin; the control cell was tested by cycling under identical conditions.

At the fifth discharge the capacity of the test cell containing the separator of the present invention was 103% of nominal capacity, while that of the control cell was 115% of nominal. The capacity of the test cell remained somewhat lower than that of the control cell through 50 cycles, but at the 75th cycle the capacity of the test cell was substantially greater than that of the control cell. The capacity of the control cell dropped to 50% of nominal by the 99th cycle, while that of the test cell did not reach that level until the 105th cycle.

EXAMPLE 3

The solid finely-divided ionically cross-linked resin of Example 1 was ground further to pass a 200 mesh screen. Approximately 70 parts by weight of this material was stirred slowly, over a period of about 15 minutes into 700 parts of 50% by weight aqueous sulfuric acid chilled with dry ice. The slurry was then stirred further at room temperature and allowed to stand.

A 8" x 9" x 1/8" glass plate was covered with 2-mil Teflon film, which was held on by masking tape along its margins. A layer of 1.4 mil non-woven polypropylene fabric was taped over this. A second glass plate, of the same outside dimensions, but with a 6¼" x 6¼" square hole cut in the middle was taped on top of the first plate. This formed an "open mold," 6¼" x 6¼" x 1/8".

Approximately 110 grams of slurry was patted into the containing mold. The mold was then placed in a vacuum oven which was heated to 85° C. at 28 inches of mercury vacuum. After 8 hours, the mold was removed from the oven and cooled to room temperature in a dessicator. The slurry had coalesced into a coherent tacky rubbery gel, which was cut from the mold with a razor blade. A sheet of polypropylene non-woven fabric was placed on the exposed side of the membrane surface. The polypropylene non-woven fabric taped onto the plate had adhered to the bottom side of the gel but the gel released easily from the Teflon sheet. The gel, which had a thickness of 65 mils, had an acid content of 1.05 grams per square inch.

A portion of the gel was pressed to 52 mils gauge to form a separator sheet in a hydraulic press at room temperature.

Separators prepared as described above produced approximately the same results as those of Example 1 in a conventional lead sulfuric acid storage battery. By employing a suitably shaped molding surface during the pressing step there was produced a separator having a plurality of spaced parallel ribs of conventional size and configuration at one or both faces of the separator, which improved the circulation of electrolyte in the cell.

Similar results have been achieved using ratios of 50% aqueous sulfuric acid to cross-linked resin from 2.5:1 to 7.5:1 by weight. It has also been found satisfactory to carry out the drying in a circulating air oven instead of in a vacuum.

EXAMPLE 4

Ten parts by weight of the finely-divided ionically cross-linked resin complex described in Example 2 were mixed with 32 parts of 80% by weight aqueous sulfuric acid while cooling with ice, resulting in a dark-colored viscous paste. The paste was placed in a Teflon-coated cavity mold preheated to 145° F. and subjected to pressure between the platen of a hydraulic press to form a coherent soft gel sheet which could be separated from the Teflon surface and employed as a separator in the same manner as the separators of Examples 1 to 3. The paste could also be shaped by hot extrusion through a suitable die orifice. Similar results were achieved using ratios of 80% by weight aqueous sulfuric acid and ionically cross-linked resin from 10:1 to 2.5:1 by weight.

The separators prepared as described above are also useful in hydrogen-oxygen fuel cells containing aqueous potassium hydroxide electrolyte; their use in fuel cells containing aqueous acidic electrolytes is even more advantageous.

Although specific embodiments have been described herein, it is not intended to limit the invention solely thereto but to include all of the obvious variations and modifications within the spirit and scope of the appended claims.

What is claimed is:

1. An electrical energy producing device comprising a plurality of opposed electrodes in contact with an aqueous liquid electrolyte having disposed between a pair of opposite electrodes a separator sheet consisting essentially of a continuous gel structure having a lattice in which the sole reactants are two ionically associated synthetic organic polymers, one of said polymers having dissociable anionic groups attached to a polymeric structure which without the said anionic groups forms a water insoluble film forming resin, and the other of said polymers having dissociable cationic groups attached to a polymeric structure which without said cationic groups forms a water insoluble film forming resin, each of said polymers having sufficient dissociable groups to render it water soluble in the absence of the other.

2. A device as claimed in claim 1 in which said anionic groups are sulfonate groups, said cationic groups are quaternary ammonium groups, and said polymers are bonded together solely by said ionic association.

3. A device as claimed in claim 2 in which the device is a lead-sulfuric acid storage battery and the electrolyte is sulfuric acid.

4. A device as claimed in claim 3 in which one of the polymers is of a styrene sulfonate and the other polymer is of vinyl benzyl quaternary ammonium compound.

5. In a lead-sulfuric acid battery having a plurality of electrodes in contact with aqueous sulfuric acid electrolyte, a separator disposed between a pair of opposed electrodes consisting essentially of a continuous gel structure having a lattice in which the sole reactants are two ionically associated synthetic organic polymers, one of said polymers having dissociable anionic sulfonate groups attached to a polymeric structure which without the said anionic groups forms a water insoluble film forming resin, and the other of said polymers having dissociable cationic quaternary ammonium groups attached to a polymeric structure which without said cationic groups forms a water insoluble film forming resin, each of said polymers having sufficient dissociable groups to render it water soluble in the absence of the other, said polymers being bonded together solely by said ionic association.

6. A battery as claimed in claim 5 in which said anionic groups are sulfonate and said cationic groups are quaternary ammonium.

7. A battery as claimed in claim 5 in which one of the polymers is of a styrene sulfonate and the other polymer is of vinyl benzyl quaternary ammonium compound.

8. A separator for use between opposed electrodes of an electrical energy producing device comprising a plurality of electrodes in contact with an aqueous liquid electrolyte, said separator being in the form of a sheet having on at least one face a plurality of spaced parallel ribs, said sheet consisting essentially of a continuous gel structure having a lattice in which the sole reactants are two ionically associated synthetic organic polymers, one of said polymers having dissociable anionic groups attached to a polymeric structure which without the said anionic groups forms a water insoluble film forming resin, and the other of said polymers having dissociable cationic groups attached to a polymeric structure which without said cationic groups forms a water insoluble film forming resin, each of said polymers having sufficient dissociable groups to render it water soluble in the absence of the other.

9. A separator as claimed in claim 8 in which said anionic groups are sulfonate groups, said cationic groups are quaternary ammonium groups, and said polymers are bonded together solely by said ionic association.

10. A separator as claimed in claim 9 in which one of the polymers is of a styrene sulfonate and the other polymer is of vinyl benzyl quaternary ammonium compound.

References Cited

UNITED STATES PATENTS

| | | | |
|---|---|---|---|
| 3,037,899 | 6/1962 | Vedovelli | 136—145 XR |
| 3,232,916 | 2/1966 | Fogle | 136—146 XR |
| 3,240,723 | 3/1966 | Friedlander | 136—146 XR |
| 3,275,575 | 9/1966 | Fogle | 136—153 XR |
| 3,284,238 | 11/1966 | White | 136—153 XR |
| 3,297,484 | 1/1967 | Niedrach | 136—86 |
| 3,324,068 | 6/1967 | Michaels | 136—146 XR |

WINSTON A. DOUGLAS, *Primary Examiner.*

D. L. WALTON, *Assistant Examiner.*

U.S. Cl. X.R.

136—146, 157